US009008501B2

(12) United States Patent
Lutgen

(10) Patent No.: US 9,008,501 B2
(45) Date of Patent: Apr. 14, 2015

(54) NETWORK AND METHOD FOR PROVIDING REDUNDANCY IN AN OPTICAL DISTRIBUTION NETWORK

(71) Applicant: Tellabs Bedford, Inc., Naperville, IL (US)

(72) Inventor: Craig L. Lutgen, Richardson, TX (US)

(73) Assignee: Tellabs Bedford, Inc., Naperville, IL (US)

( * ) Notice: Subject to any disclaimer, the term of this patent is extended or adjusted under 35 U.S.C. 154(b) by 120 days.

(21) Appl. No.: 13/766,495

(22) Filed: Feb. 13, 2013

(65) Prior Publication Data

US 2014/0226966 A1    Aug. 14, 2014

(51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04B 10/032 | (2013.01) |
| H04J 14/02 | (2006.01) |

(52) U.S. Cl.
CPC .......... *H04B 10/032* (2013.01); *H04J 14/0283* (2013.01); *H04J 14/029* (2013.01)

(58) Field of Classification Search
CPC .............................. H02J 9/005; H04J 14/0297
USPC ........... 398/2, 3, 4, 5, 12, 38, 19, 83, 54, 129, 398/60
See application file for complete search history.

(56) References Cited

U.S. PATENT DOCUMENTS 5,523,868 A  *  6/1996  Hawley ........................... 398/38
5,923,449 A  *  7/1999  Doerr et al. ....................... 398/7
(Continued)

FOREIGN PATENT DOCUMENTS

EP        2148453  A1  *  1/2010

OTHER PUBLICATIONS

International Telecommunications Union (ITU), ITU-T Telecommunication Standardization Sector of ITU, G.984.1, Series G: Transmission Systems and Media, Digital Systems and Networks, Digital Sections and Digital Line System-Optical Line Systems for Local and Access Networks, Gigabit-Capable Passive Optical Networks (GPON): General Characteristics, Section 14, pp. 8-11 (Mar. 2008).

*Primary Examiner* — Ken Vanderpuye
*Assistant Examiner* — Jose Luis F Pugeda
(74) *Attorney, Agent, or Firm* — Hamilton, Brook, Smith & Reynolds, P.C.

(57) ABSTRACT

Disclosed herein are optical distribution networks and corresponding methods for providing physical-layer redundancy. Example embodiments include a head-end passive optical splitter-combiner (OSC) to split optical signals from an Optical Line Terminal (OLT) onto primary and secondary optical paths for redundant distribution to optical network terminal(s) (ONTs), a passive access OSC for tapping the redundant signals, and an optical switch for selecting between the redundant signals and providing an ONT access to the selected signal. Example optical distribution networks and corresponding methods provide multiple drop points, a fully cyclical path, and autonomous protection switching, all at low cost. A further advantage of these networks and methods is that where faults may occur, maintenance may not be required for a certain time.

22 Claims, 13 Drawing Sheets

(56) References Cited

U.S. PATENT DOCUMENTS

| | | | |
|---|---|---|---|
| 6,327,400 B1 * | 12/2001 | Harstead et al. | 385/22 |
| 7,272,321 B1 * | 9/2007 | Kuo et al. | 398/99 |
| 2002/0071149 A1 * | 6/2002 | Xu et al. | 359/110 |
| 2005/0019031 A1 * | 1/2005 | Ye et al. | 398/19 |
| 2008/0037988 A1 * | 2/2008 | Bullock | 398/59 |

* cited by examiner

NETWORK AND METHOD FOR PROVIDING REDUNDANCY IN AN OPTICAL DISTRIBUTION NETWORK

BACKGROUND OF THE INVENTION

Passive optical network (PON) technology depends on a single physical optical fiber medium with passive optical splitter-combiners (OSCs) to propagate a signal from a single optical line terminal (OLT) to one or more optical network terminals (ONTs). Typically, a fiber span from the OLT to the OSC (e.g., from a central office to a location in a neighborhood) has a longer reach than the fiber span from the OSC to ONTs (e.g., from a location in the neighborhood to residences or homes).

SUMMARY OF THE INVENTION

In one embodiment, an optical distribution network (ODN) includes a head-end passive optical splitter combiner (OSC) optically disposed between an optical line terminal (OLT) and a primary optical path and a secondary optical path, the primary and secondary optical paths optically disposed between the OLT and at least one optical network terminal (ONT). At least one passive access OSC is optically coupled to the head-end OSC via the primary and secondary optical paths, and an optical switch is optically coupled to a respective access OSC between the respective access OSC and a corresponding ONT.

In a second embodiment, a method comprises splitting optical signals from an OLT into a primary optical signal, directed to propagate along a primary optical path, and a secondary optical signal, directed to propagate along a secondary optical path. The method also comprises selectably optically coupling the primary optical path or the secondary optical path to an ONT to enable the ONT to receive the primary or secondary optical signal, respectively.

In a third embodiment, an apparatus in an optical distribution network includes a means for splitting optical signals from an OLT into a primary optical signal, directed to propagate along a primary optical path, and a secondary optical signal, directed to propagate along a secondary optical path. The apparatus also includes a means for selectably optically coupling the primary or secondary optical signal from the primary optical path or the secondary optical path, respectively, to an ONT to enable the ONT to receive one of the optical signals.

In a fourth embodiment, a method comprises selecting an OLT from a primary OLT and a secondary OLT, the selecting being based at least in part upon a functional status of either the primary or secondary OLT. The method also includes splitting optical signals from the selected OLT into a primary optical signal, directed to propagate along a primary optical path, and a secondary optical signal, directed to propagate along a secondary optical path. The method also includes selectably optically coupling the primary optical path or the secondary optical path to an ONT to enable the ONT to receive the primary or secondary optical signal, respectively.

In a fifth embodiment, an optical distribution network includes a primary optical path optically disposed between a first optical port card of an OLT and at least one ONT. The network also includes a secondary optical path optically disposed between a second optical port card of the OLT and the ONT, at least one passive access OSC optically coupled to the first and second optical port cards via the primary and secondary optical paths, respectively, and an optical switch optically coupled to a respective access OSC between the respective access OSC and the corresponding ONT.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
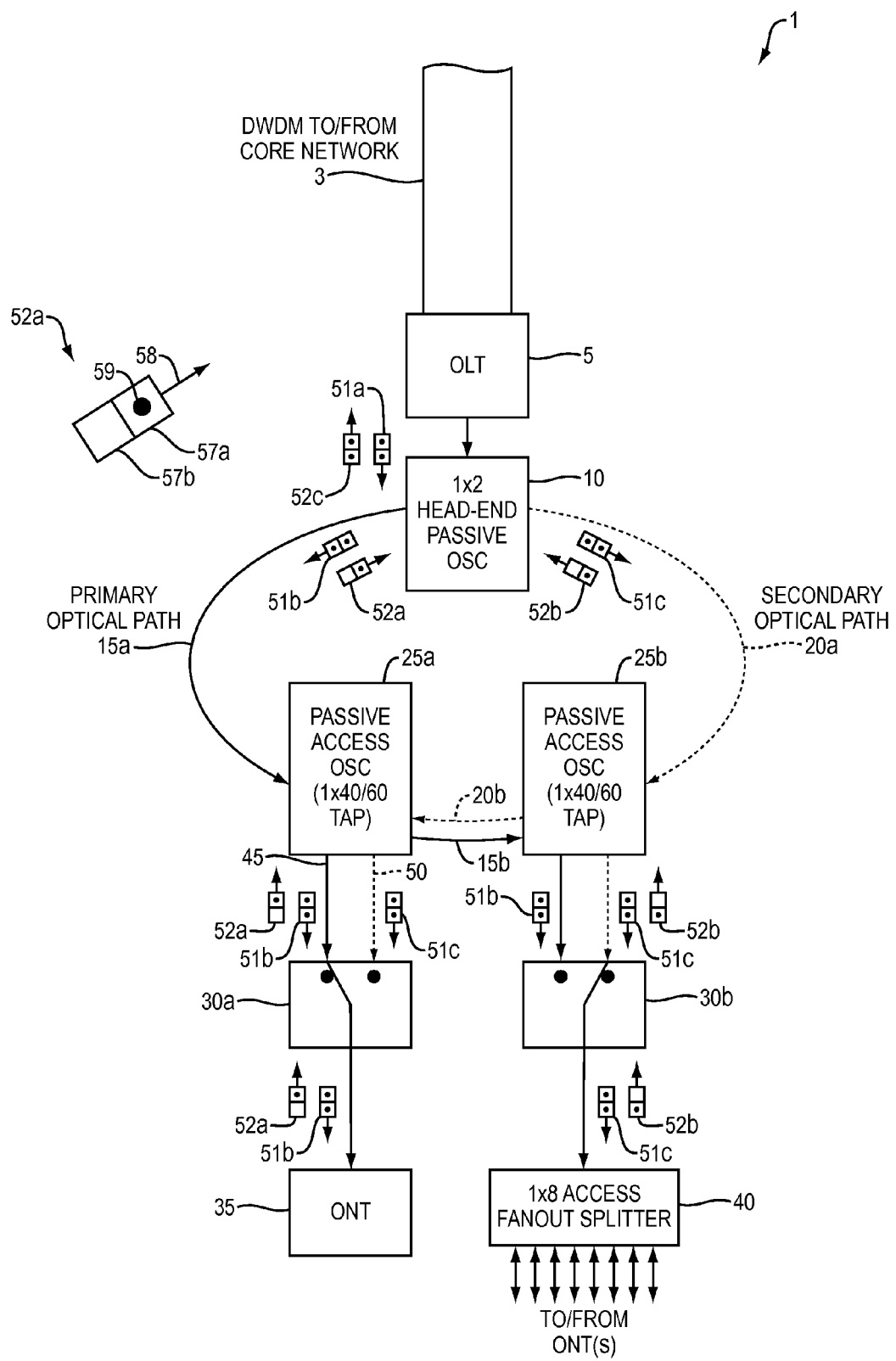
FIG. 1A is a schematic diagram of an optical distribution network (ODN) that includes two passive access optical splitter combiners (OSCs) and corresponding optical switches.

A description of example embodiments of the invention follows.

Basic passive optical networks (PONs), such as PONs that serve as access networks, are susceptible to cuts, damages, or other fault conditions in a fiber, particularly in the fiber of longest reach, possibly causing loss of network availability to the PON endpoints afforded access to the network via that fiber. Previous approaches to providing redundancy have been inadequate for various reasons. For example, in International Telecommunication Union (ITU) G.984.1-Type A, the spare fiber must be dark in order to prevent signal integrity issues caused by differentials in optical signal propagation delays between the two fibers due to length or medium, for example. An external mechanism is required to place the dark fiber in service as needed. Type A has now been deprecated from the ITU specifications.

Other ITU G.984.1 approaches are also inadequate. In ITU G.984.1-Type B, a dual-input optical splitter is utilized with some form of arbitration in the optical line terminals (OLTs) to ensure that only a single optical transmitter is active at a given time. A disadvantage of Type B is that it requires an additional OLT PON interface to provide the backup service to the PON fiber. In ITU G.984.1-Type C, two fully duplicate OLT transmitters, optical distribution networks (ODNs), and ONT PON interfaces are used. However, the ONT gigabit passive optical network (GPON) subsystem in Type C is able to provide fast automatic protection switching to transceiver data on only one of those PON interfaces at a given time. The Type C approach also requires advanced and costly automatic protection switching devices in the ONT, and it duplicates the cost of the entire ODN and OLT. In ITU G.984.1-Dual-parenting, a multiplexer external to the ODN is required in/at the optical network unit to combine/distribute data connections to/from each active ODN. In this case, two fully operational sets of PONs, ODNs and OLTs are in use, so the overall network cost is doubled.

Embodiments of the present invention provide an ODN and corresponding method for using spatially diverse fibers with optical switches and optical splitter-combiners (OSCs) to offer redundancy an access network without requiring additional central office equipment. While ODN embodiments may resemble traditional optical ring topologies in affording multiple drop points, embodiments also provide a fully cyclical path and autonomous protection switching. A further advantage of embodiments of the present invention is that where faults occur, emergency maintenance may be avoided. Because the embodiments are self-protecting, repairs may be able to be delayed until a regular maintenance interval, reducing network maintenance costs.

Embodiments of the invention may utilize an ability of optical transmission and fiber optics technologies to (i) control and split a single physical layer signal sent from an OLT located in a central office to many ONTs, and (ii) recombine the split signals in the reverse direction. In the OLT-to-ONT (downstream) direction, a basic mode of operation is that signals are split at passive OSCs. Conversely, in the ONT-to-OLT (upstream) direction, optical signals from various ONTs are combined to reach a single active OLT.

Embodiments of this invention may employ a head-end OSC to split optical signals of a GPON ring ODN. At each GPON add-drop multiplexer node, counter-circulating versions of those same signals may be fed into two separate input ports of an active A/B optical switch. The switch may then provide only the strongest version of that signal out of the GPON and add-drop multiplexer (ADM) to the input of a standard passive optical splitter.

Switching, as the term is used in this application, means changing the state of an optical switching device such that one or another of the input paths to the optical switch is optically coupled to an output path of the optical switching device or to devices(s) optically coupled to the output path. Thus, switching may also be referred to as selectively optically coupling.

Embodiments of the invention may utilize devices, called optical taps or passive access OSCs, that symmetrically or asymmetrically split signal strength to circulate only a variable fractional portion of the split signal in order to yield maximum power at the far end of the range in each counter-circulating direction, while still affording an adequate signal strength to achieve long-reach GPON networks of 10 km or further from the OLT, around the ring, to each ONT.

Embodiments of the present invention enable ODNs to recover from a fault condition. The ODNs may be primarily passive, but they may contain active components such as switches to monitor redundant optical paths and automatically switch in response to power level, other signal criteria, or fault conditions. Therefore, because the ODNs may incorporate some active components, the ODNs may not be referred to as passive ODNs, but rather simply as ODNs.

FIG. 1A is a schematic diagram of an ODN 1. The ODN 1 includes a head-end OSC 10 optically connected to an OLT 5. The head-end OSC 10 splits a signal 51a from the OLT 5 onto a primary optical path segment 15a and a secondary optical path segment 20a. The signal 51a is split into primary and secondary signals 51b and 51c onto the primary optical path segment 15a and secondary optical path segment 20a, respectively.

The primary and secondary path signals 51b and 51c both reach a first passive access OSC 25a. The first access OSC 25a further splits the primary signal 51b to provide a portion of the primary signal 51b to continue propagating through primary optical path segment 15b and another portion of the primary signal 51b to be routed to a first optical switch 30a. The secondary signal 51c also reaches the first access OSC 25a and further propagates to the switch 30a. The switch 30a selects one of the signals 51b and 51c to propagate further to an ONT 35.

The ODN 1 further includes a second passive access OSCs OSC 25b. In the ODN 1, the second OSC 25b likewise receives the downstream signals 51b and 51c via the primary and secondary optical paths 15a and 20a and routes at least a portion of these signals to a second switch 30b. The second switch 30b selects one of the signals 51b and 51c to propagate to a 1×8 access fanout OSC 40. The fanout OSC 40 is optically connected to the second switch 30b, enabling eight ONTs to receive the signal that is routed through the second switch 30b. The OLT 5 may be connected to an optical path 3 carrying DWDM or other signals propagating to and from a core network (not shown).

Some embodiments may include only a single passive access OSC, such as the first OSC 25a, and a single optical switch, such as the first switch 30a. However, in such embodiments, the passive access OSC may be rendered unnecessary, and the primary and secondary optical paths may be directly connected to the single optical switch.

Continuing to refer to FIG. 1A, in the downstream direction, the signal 51a from the OLT 5 is routed through the head-end OSC 10 and split onto the primary optical path segment 15a and the secondary optical path segment 20a. The signal 51b (in the primary optical path) propagates through the first access OSC 25a. The first access OSC 25a routes a portion of the signal 51b to the first switch 30a. The first access OSC 25a may also be referred to as a tap or a 1×40/60 tap because it has a 40/60 splitting ratio. The first access OSC 25a directs 60% of the power in the primary signal 51b along an optical path 45 to the first switch 30a. The first switch 30a is configured to switch to the path with the higher power level. In other embodiments, the switching may be in response to other criteria, such as a power threshold or signal parameter. In this embodiment, the path with higher optical power level is path 45, rather than path 50, provided there is no fault condition. Thus, the primary downstream signal 51b reaches the ONT 35. Routing of the signals through the OSCs is further explained later in the detailed description.

In the upstream direction, the ONT 35 sends a return upstream signal 52a through the first switch 30a, onto optical path 45, through the first OSC 25a, and onto the primary optical path segment 15a, which is connected through the head-end OSC 10 back to the OLT 5.

The return signal 52a is detailed on the left of FIG. 1A. The signal 52a includes first and second time slots 57a and 57b, respectively. These time slots may represent data frames, sets of data frames, or fractions of data frames, for example. The slots are equal in length in network 1, but in other embodiments they may be of unequal lengths. The time slot 57a corresponds to signals from the ONT 35, which are connected to the primary optical path 15a via the first access OSC 25a and the first switch 30a. The second time slot 57b represents a time allocation for signals from any ONTs that are associated with the second access OSC 25b and the second switch 30b. An arrow 58 indicates the direction of propagation of the signal 52a in the primary optical path segment 15a. The first slot 57a includes a dot 59, indicating that the signal 52a includes data from the ONT 35, which corresponds to the first OSC 25a. The second slot 57b does not contain a dot, indicating that no signals associated with any ONTs (not shown) connected by the second access OSC 25b are present. Other signals shown in FIG. 1A include similar indications and markings.

The first access OSC 25a routes 40% of the power of signal 51b along the primary optical path segment 15b to the second access OSC 25b. Since the second access OSC 25b is the last access OSC along primary optical path 15a-b in the downstream direction, the second access OSC 25b routes 100% of the remaining power in the signal 51b to the second switch 30b.

The signal 51c also reaches the second access OSC 25b via the secondary optical path segment 20a. The second access OSC 25b directs 60% of the power of signal 51c to the second switch 30b. The second switch 30b is configured to select the optical path with the greatest optical power, which is the path carrying the secondary optical signal 51c. The secondary optical signal 51c reaches the 1×8 fanout OSC 40 and is routed to the ONTs connected to the OSC 40.

The upstream signal 52b carries signals from ONTs optically connected to fanout OSC 40. The signal 52b is routed upstream through the second switch 30b, through the second access OSC 25b, through the secondary optical path 20a, and through the head-end passive OSC 10 to the OLT 5.

In the network 1, the primary optical path 15a-b reaches both of the access OSCs 25a and 25b and, thus, both the primary and secondary optical signals 51a and 51b are available to be selected and optically connected to ONTs corresponding to either of the access OSCs 25a and 25b. However, the primary optical path 15a-b ends at the last access OSC in the downstream path; thus, the upsteam signal 52a on primary optical path 15a-b reaches the head-end OSC 10 and the OLT 5 via only one path at any given time, thus avoiding interference issues. Similarly, signals on the secondary optical path 20a-b are made available to both of the access OSCs 25a-b, but the upstream signal 52b reaches the head-end OSC 10 and the OLT 5 via only one path at any time, typically the secondary path segment 20a in the absence of fault conditions.

Embodiments of ODNs within the scope of the invention may include an optical switch configured to switch in an event it detects a loss of signal from the OLT. An optical switch may also be configured to switch in an event that it detects a loss of signal from a corresponding ONT. An optical switch or monitor of the optical switch may be configured to activate an alarm signal in an event the optical switch loses electrical power.

Some embodiments may include a passive access fanout OSC optically disposed between the access OSC and multiple corresponding ONTs. In some embodiments, such as network 200 in FIG. 2A described in more detail below, the OLT is configured to initiate a re-ranging procedure with at least one ONT in an event the OLT detects a loss of signal from the ONT.

Some embodiments, such as network 1 in FIG. 1A, include a plurality of passive access OSCs. In these embodiments, signal interference issues may be eliminated by optically coupling the head-end OSC to its optically adjacent access OSCs by the primary optical path or the secondary optical path, and by optically coupling access OSCs that are optically adjacent to each other by both the primary and secondary optical paths. The one or more passive access OSCs may have splitting ratios different from 50%, as in network 1. The splitting ratio of an access OSC may be based on how many access OSCs are included within the network.

In some embodiments, the OLT may be a primary OLT, and the network may further include a secondary or standby OLT, optically connected to the head-end passive OSC. The standby OLT may be configured to communicate with the ONT via the primary or secondary optical path in an event the primary OLT fails.

Figure 1B:
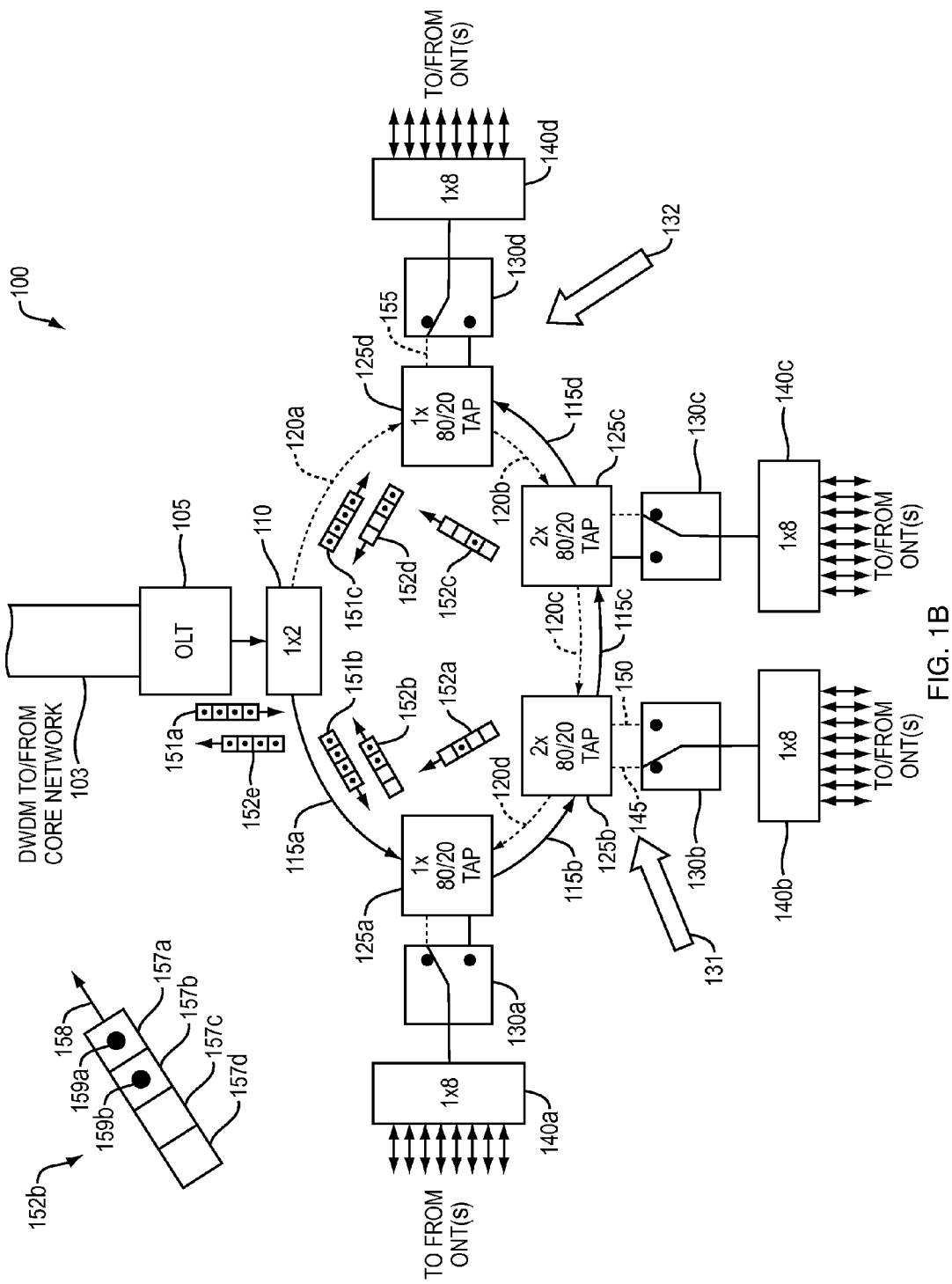
FIG. 1B is a schematic diagram of an ODN that includes four access OSCs and corresponding switches.

FIG. 1B is a schematic diagram of an optical distribution network 100. Network 100 includes an optical path 103 for DWDM signals traveling between a core network (not shown) and an OLT 105. The network 100 is similar in many respects to the network 1 of FIG. 1A, including having a head-end OSC 110. Some differences are that the network 100 of FIG. 1B includes four passive access OSCs 125a-d, four optical switches 130a-d corresponding to the access OSCs 125a-d, respectively, and four 1×8 access fanout OSCs 140a-d corresponding to the access OSCs 125a-d and the optical switches 130a-d, respectively. Each of the fanout OSCs 140a-d enables eight corresponding ONTs to receive signals from OLT 105.

The access OSCs 125a-d have splitting ratios of 80/20 in the example network 100, but may have other splitting ratios known in the art sufficient to meet optical power budgets throughout the respective optical paths. The first and fourth access OSCs 125a and 125d, respectively, which are adjacent to the head-end OSC 110, each split only one of the optical path segments 115a and 120a. Thus, the access OSCs 125a and 125d may be referred to as 1×80/20 access OSCs or taps. In contrast, the second and third access OSCs 125b and 125c, respectively, split both optical paths 115a and 120a. Therefore, the access OSCs 125b and 125c may be referred to as to 2×80/20 access OSCs or taps.

A primary optical path 115a-d passes through each access OSC 125a-d in the network 100. The fourth access OSC 125d routes 100% of the remaining power of the downstream primary optical signal 151b to the fourth optical switch 130d. No portion of a downstream primary optical signal 151b makes a full loop to return to the head-end OSC 110 again, thus avoiding interference issues. Similarly, a downstream secondary optical signal 151c passes through each access OSC 125a-d, and the first access OSC 125a directs 100% of the remaining power of the signal 151c to the first switch 130a.

Primary optical signals 151a-c are shown with four segments or time slots, each time slot being allocated to any ONTs (not shown) connected to the network 100 through one of the access OSCs 125a-d, respectively. Similarly, return optical signals 152a-e are each shown with four time slots, each slot corresponding to ONTs optically connected to the network 100 through one of the access OSCs 125a-d.

An upstream optical signal 152b is shown in greater detail in the upper left portion of FIG. 1B. The signal 152b includes a first time slot 157a, corresponding to ONTs optically connected to the network 100 through the first access OSC 125a. Second, third, and fourth time slots 157b-d similarly correspond to the access OSCs 125b-d, respectively. A first dot 159a in the first slot 157a indicates that the signal 152b contains data corresponding to the first access OSC 125a.

Similarly, a second dot 159b in the second slot 157b indicates that the signal 152b contains data corresponding to the second access OSC 125b. In contrast to the slots 157a-b, third and fourth slots 157c-d do not include dots, indicating that the signal 152b contains no data corresponding to ONTs optically connected to network 100 through the third and fourth access OSCs 125c-d. An arrow 158 indicates the direction of propagation of the signal 152b in the primary optical path segment 115a, which is upstream toward the head-end OSC 110.

A downstream signal 151a, propagating downstream from the OLT 105, is split by the head-end OSC 110 into primary and secondary signals 151b and 151c in primary path segment 115a and secondary path segment 120a, respectively. The primary optical signal 151b reaches each access OSC 125a-d in the primary path 115a-d. Similarly, the secondary optical signal 151c reaches each access OSC, but is not further connected to the head-end OSC 110, thus avoiding interference issues.

Upstream signals in network 100 arrive at the head-end OSC 110 via both the primary and secondary paths 115a-d and 120a-d. In the network 100 of FIG. 1B, as in the network 1 of FIG. 1A, the optical switches 130a-d are configured to select the optical path having higher optical power. Assuming even power splitting in the head-end OSC 110, roughly equivalent line losses in the primary and secondary paths, and lack of any fault condition, the first and second switches 130a-b select the primary optical signal 151b, while the third and fourth switches 130c-d select the secondary optical signal 151c. Thus, in the primary optical path segment 115b, the upstream signal 152a includes upstream data transmissions from ONTs optically connected to the network 100 by the second access OSC 125b, while the signal 152b includes data corresponding to both the first and second access OSCs 125a and 125b. Similarly, an upstream signal 152c includes only data corresponding to the third access OSC 125c, while the upstream signal 152d includes data from both the third and fourth access OSCs 125c-d. The upstream signals 152b and 152d are combined in the head-end OSC 110 to form an upstream signal 152e that includes data corresponding to each of the four access OSCs 125a-d and that continues on to reach the OLT 105.

The routing of signals through the second access OSC 125b and the second optical switch 130b in the region indicated by an arrow 131 is shown in greater detail in FIG. 1C, described in detail below. Similarly, the routing of signals through the fourth access OSC 125d and the corresponding fourth optical switch 130d in the region indicated by an arrow 132 is further detailed in FIG. 1D, described in detail below.

Figure 1C:
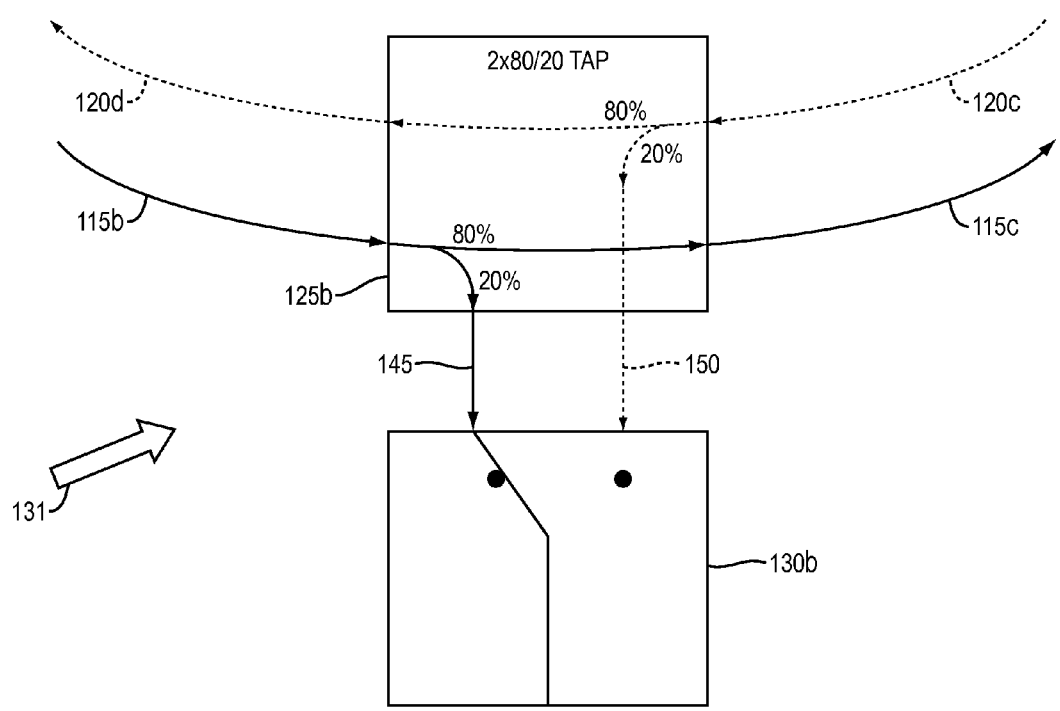
FIG. 1C is a schematic diagram showing a 2×80/20 access OSC, a corresponding optical switch, and the optical paths associated with the access OSC and the optical switch.

FIG. 1C is a schematic diagram showing the 2×80/20 second access OSC 125b, the corresponding second optical switch 130b, and the optical paths associated therewith. Primary optical signals on the primary optical path segment 115b pass into the second access OSC 125b. The second OSC 125b routes 20% of the power of the corresponding primary optical signals along a path 145 to the second switch 130b, with the remaining 80% power continuing to the primary path segment 115c. The secondary optical signals propagating in the secondary path segment 120c likewise enter the second access OSC 125b, which routes 20% of the corresponding optical power to a path 150 and to the second switch 130b, with the remaining 80% power being directed onto the secondary path segment 120d.

Figure 1D:
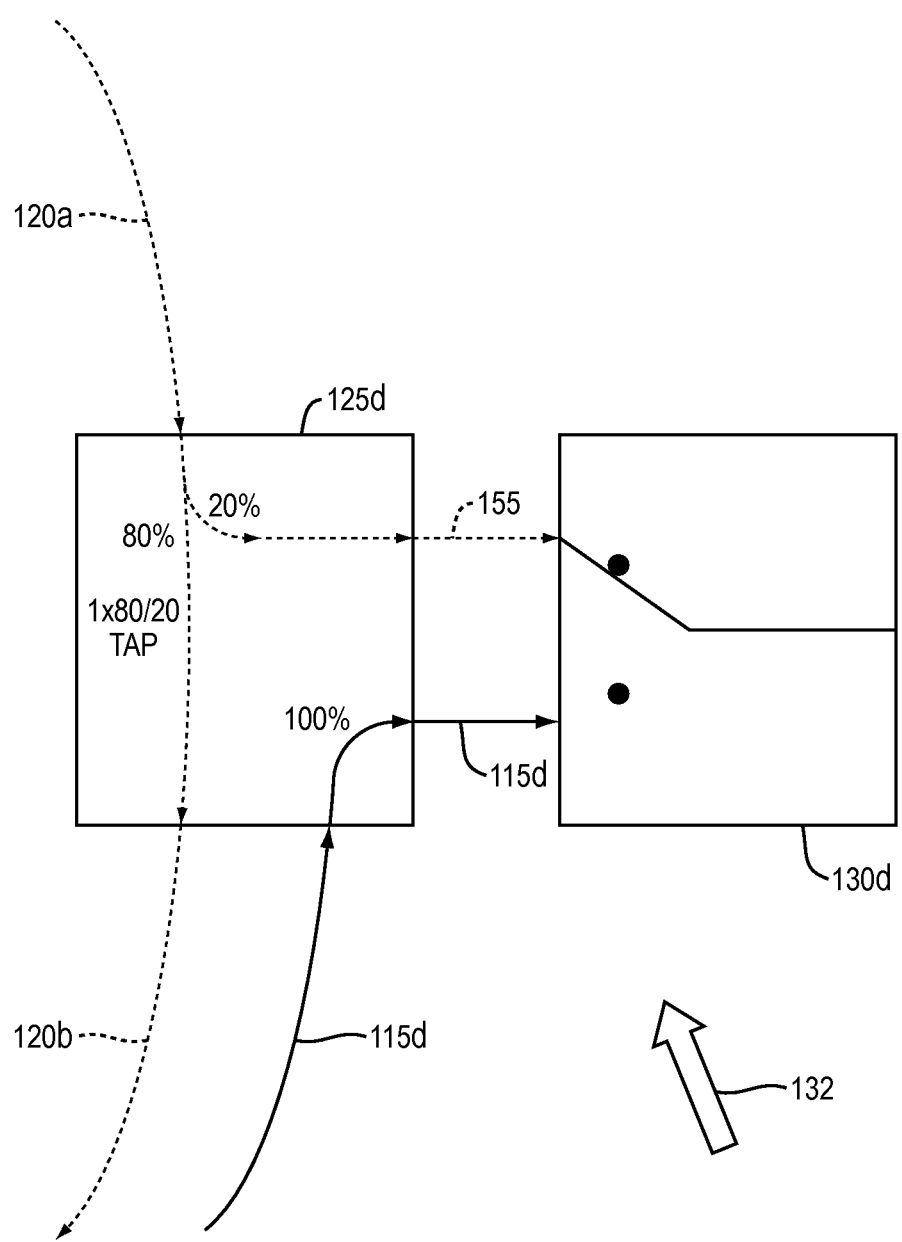
FIG. 1D is a schematic diagram showing a 1×80/20 access OSC, a corresponding optical switch, and the optical paths associated with the access OSC and the optical switch.

FIG. 1D is a schematic diagram showing the 1×80/20 fourth access OSC 125d, the corresponding fourth optical switch 130d, and the optical paths associated therewith. The fourth access OSC 125d is a 1×80/20 tap, meaning that only one of the optical paths is split. Primary optical signals traveling in the primary optical path segment 115d enter the fourth access OSC 125d, and 100% of the power of the primary optical signals continues on the path segment 115d and is routed to the corresponding fourth switch 130d. One hundred percent of the power is directed to the corresponding fourth switch 130d because the fourth access OSC 125d is the last access OSC to access the primary optical signal 151a in the downstream direction along the primary path 115a-d. In contrast, the fourth access OSC 125d directs 20% of the optical power of secondary optical signals propagating in secondary path segment 120a to a path 155 and on to the fourth optical switch 130d, with the remaining 80% power being directed onto the secondary path segment 120b.

Figure 2A:
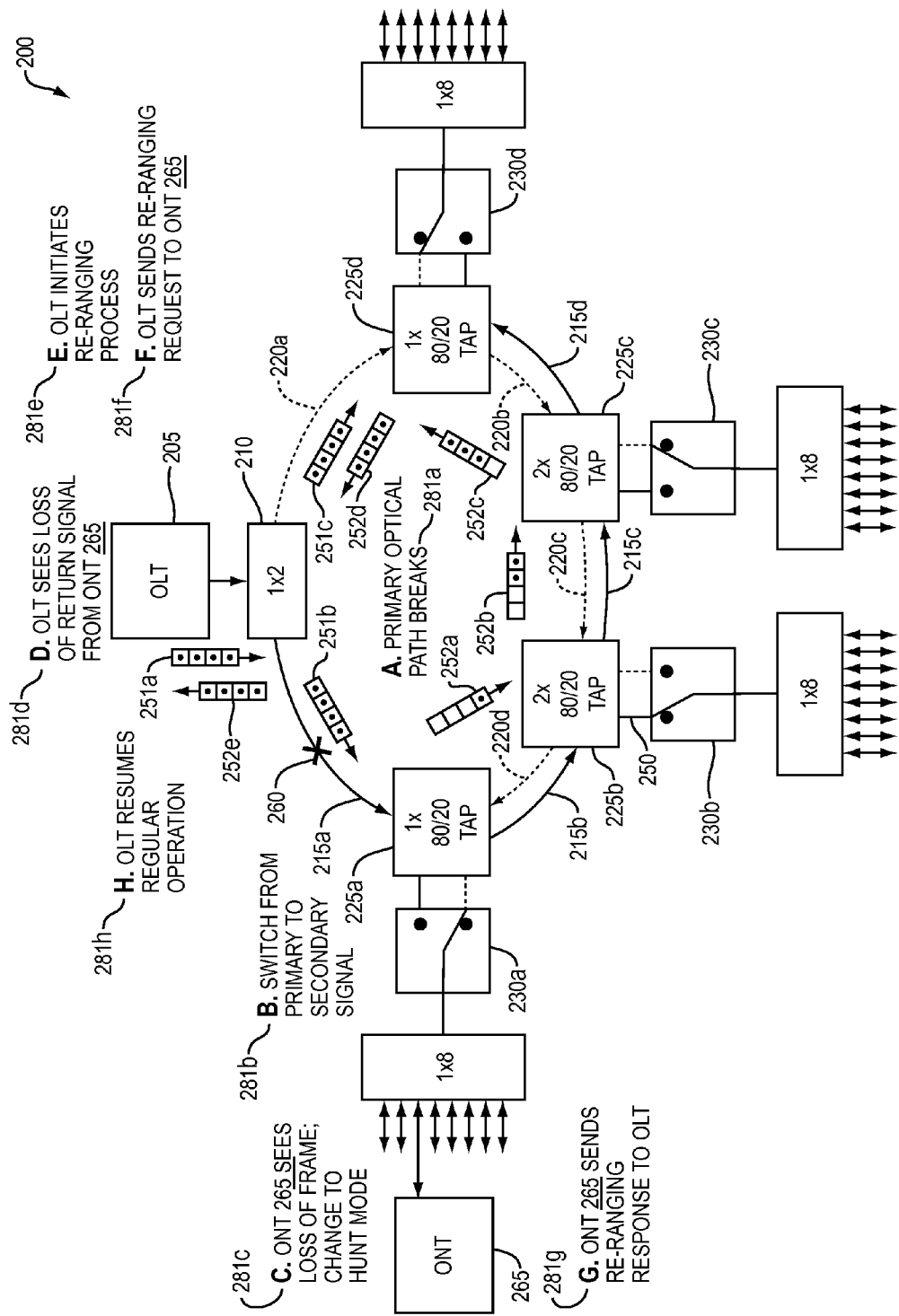
FIG. 2A is a schematic diagram of an ODN with a fault condition, illustrating an example procedure for recovering from the fault.

FIG. 2A is a schematic diagram of an optical distribution network 200 that is structurally similar to the network 100 in FIG. 1B, except that a fault 260 has occurred in a primary path segment 215a. Also illustrated in FIG. 2A is an example procedure 281a-h for recovery of communication between an OLT 205 and a particular ONT 265. At 281a, the fault 260 occurs in the primary path segment 215a. At 281b, a first switch 230a switches from a primary signal 251b to a secondary signal 251c on a secondary path segment 220d. At 281c, the ONT 265 sees a loss of data frame from the primary optical path 215a and changes from active mode to hunt mode. At 281d, the OLT 205 identifies the loss of return (or upstream) signal from the ONT 265.

Because there is a change in optical path lengths between the OLT 205 and the ONT 265, the OLT 205 identifies that a re-ranging is needed to enable proper timing in upstream communications between the ONT 265 and OLT 205, as understood in the art. At 281e, the OLT 205 initiates a re-ranging procedure. At 281f, the OLT 205 sends a re-ranging request to the ONT 265 via secondary optical path 220a-d. At 281g, the ONT 265 sends a re-ranging response to the OLT 205, also via the secondary optical path 220a-d. At 281h, the OLT 205 resumes regular operation. This procedure 281a-h is further illustrated in FIG. 2C. A similar recovery procedure applies to a second switch 230b and to any other ONTs (not shown) besides the ONT 265 that are connected to network 200 through the first and second switches 230a and 230b. However, third and fourth switches 230c-d and any ONTs (not shown) optically connected thereto and to third and fourth access OSCs 225c-d continue to operate as prior to the occurrence of the fault 260 because the optical paths between the OLT 205 and the other ONTs do not change in the example of FIG. 2A.

After the network 200 has recovered from the fault 260, the final configuration of the switches 230a-d is as shown in FIG. 2A. Namely, all switches select the downstream secondary signal 251c, and all upstream and downstream communications are via the secondary path 220a-d. Downstream signals 251a-c and upstream signals 252a-e are shown in their final configurations. The downstream signal 251a from the OLT 205 is split into the downstream signals 251b and 251c on the primary and secondary path segments 215a and 220a, respectively. Because of the fault 260, the downstream primary optical signal 251b does not reach any of the access OSCs 225a-d, and the primary path segments 215b-c carry no downstream signals. However, as under no-fault conditions, the signal 251c reaches all the access OSCs 225a-d along the secondary optical path 220a-d.

Upstream signals 252a-d all reach a head-end OSC 210 and the OLT 205 via the secondary optical path 220a-d. In the path segment 220b, the upstream signal 252a includes data only from the first access OSC 225a. In path segment 220c, the upstream signal 252b includes data from both the first and second access OSCs 225a and 225b. In the path segment 220b, the signal 252c includes data from the first, second and third access OSCs 225a-c. Finally, in the path segment 220a, the signal 252d includes data corresponding to all four of the access OSCs 225a-d. The upstream signal 252d passes through the head-end OSC 210 and becomes an upstream signal 252e, which is equivalent to the signal 252d, propagating toward the OLT 205.

Figure 2B:
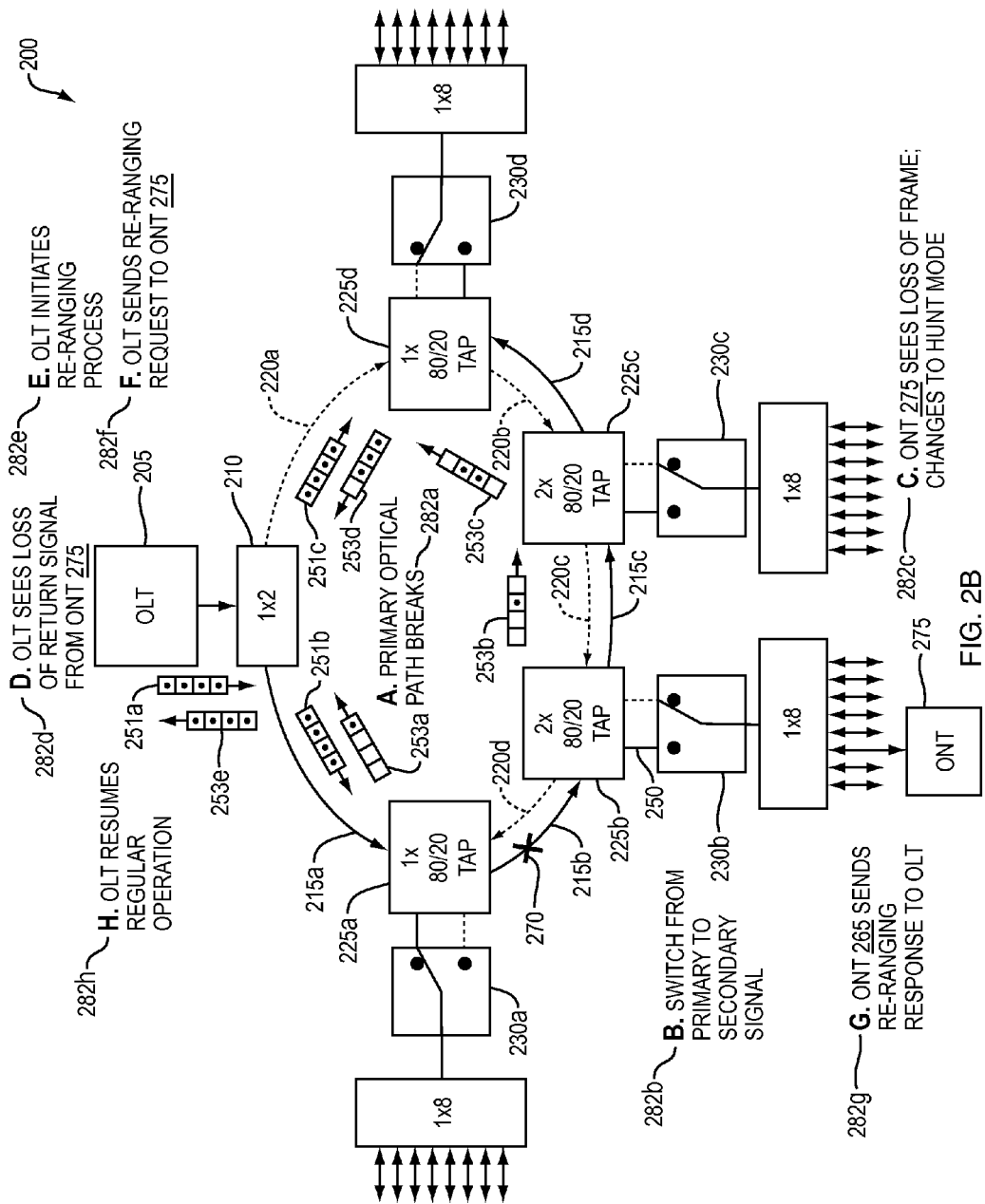
FIG. 2B is a schematic diagram having a fault condition different from that in FIG. 2A, and FIG. 2B also illustrates an example procedure for recovering from the fault.

FIG. 2B is a schematic diagram structurally similar to the diagram in FIG. 2A. However, in FIG. 2B, a fault 270 occurs in the primary optical path segment 215b. The fault recovery procedure in FIG. 2B is similar to that in FIG. 2A, except that fault recovery is illustrated with respect to an ONT 275 corresponding to the second access OSC 225b, and post-recovery upstream signals 253a-e therefore differ from the upstream signals 252a-e in FIG. 2A, in which there is no fault.

At 282a, the fault 270 occurs in the primary optical path segment 215b. At 282b, optical switch 230b switches from primary optical signal 251b to the secondary optical signal 251c. At 282c, the ONT 275 sees a loss of data frame from the OLT 205, and, responsively, the ONT 275 changes from active mode to hunt mode. At 282d, the OLT 205 sees a loss of return signal from the ONT 275. At 282e, OLT 205 initiates a re-ranging procedure with the ONT 275. At 282f, the OLT 275 sends a re-ranging request to the ONT 275. At 282g, the ONT 275 sends a re-ranging response to the OLT 205. At 282h, the OLT 205 resumes regular operation. Similar recovery procedures apply to any ONTs (not shown) other than ONT 275 that may be connected to the network through the second switch 230b.

In the final configuration after the fault recovery procedure 282a-h, the first access OSC 225a still receives the primary signal 251b, and the first switch 230a still selects the primary signal 251b, as shown in FIG. 2B. Further, the upstream signal 253a in the primary optical path segment 215a includes data corresponding to the first access OSC 225a. However, the remaining optical switches, the second, third and fourth switches 230b-d, select a secondary signal 251c because these remaining switches cannot access the primary optical signal 251b due to the fault 270. Thus, the upstream signal 253b, propagating in the secondary optical path segment 220c, includes only data corresponding to ONTs connected to network 200 via the second access OSC 230b, namely the ONT 275 and any others not shown. In the path segment 220b the signal 253c includes data corresponding to both the second and third access OSCs 230b and 230c. In the segment 220a, the signal 253d includes data corresponding to access OSCs 225b-d. The OSC 210 combines upstream signals 253a and 253d into the upstream signal 253e, which is routed to the OLT 205.

Figure 2C:
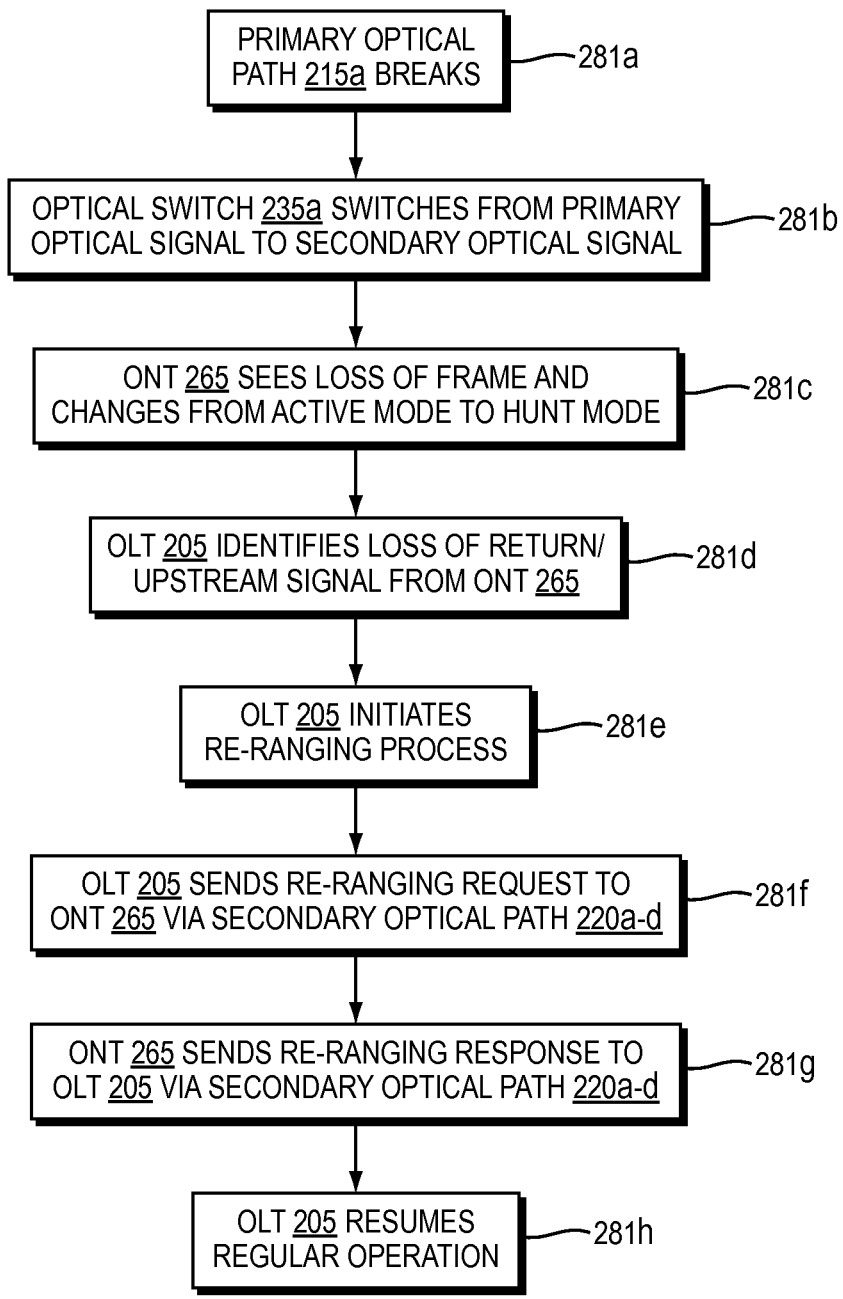
FIG. 2C is a flow diagram that shows a fault-recovery procedure that is also illustrated in FIG. 2A.

FIG. 2C further illustrates the procedure 281a-h for fault recovery from the fault 260 in the network 200 in FIG. 2A. The procedure has been explained above in reference to FIG. 2A.

Figure 3:
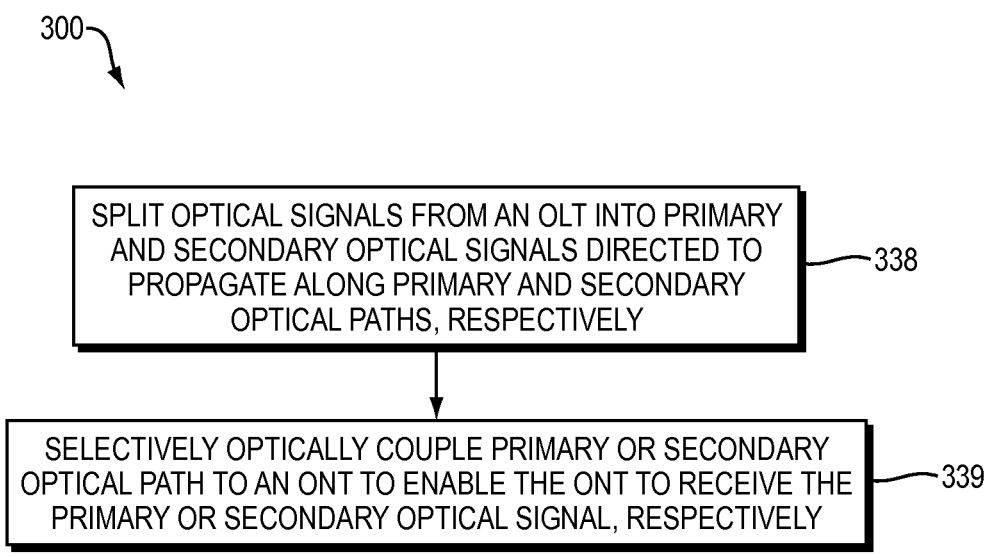
FIG. 3 is a flow diagram that illustrates a procedure for providing redundancy in an ODN.

FIG. 3 illustrates a procedure 300 for providing redundancy in an optical distribution network. At 338, optical signals from an OLT are split into primary and secondary optical signals directed to propagate along a primary optical path and a secondary optical path, respectively. At 339, either the primary or secondary optical path is selectively optically connected, or coupled, to an ONT to enable the ONT to receive the primary or secondary optical signal, respectively.

The splitting performed at 338 in procedure 300 may be head-end splitting, and the method may further include access splitting the primary and secondary optical signals to enable a plurality of ONTs to obtain optical access to the primary and secondary optical signals. Access splitting the primary and secondary optical signals may include optically directing respective power percentages of the primary and secondary optical signals to be disposed for optical switching.

In some embodiments, selectively optically coupling the primary or secondary optical path to the ONT includes optically coupling the primary or secondary optical path as a function of relative strengths of the primary and secondary optical signals. Selectively optically coupling the primary or secondary optical path to the ONT may be performed in response to a loss of detected optical power from the OLT. The primary or secondary optical path may be optically connected to the ONT in response to a loss of detected optical power from the OLT. Optically coupling the primary or secondary optical path to the ONT may be performed via an optical switch. The method may include activating an alarm in an event the optical switch loses electrical power.

Some embodiments may include access fanout splitting the primary or secondary optical signal to enable one or more additional ONTs to receive the primary or secondary optical signal. The method may include initiating a re-ranging procedure between the OLT and the ONT in an event the OLT detects a loss of signal from the ONT.

Access splitting the primary and secondary optical signals may include access splitting the primary and secondary signals at least twice, with a non-final access splitting and a final access splitting being performed for each of the signals. Each respective non-final access splitting may include optically directing a power percentage of less than 100% of the primary or secondary optical signal to be available for optical switching, with a remainder of the primary or secondary optical signal being further optically directed to propagate along the primary or secondary optical path, respectively. Each respective final access splitting may include optically directing essentially 100% of the primary or secondary optical signal to be available for optical switching.

Power percentages for the access OSCs may be based on the number of times that the primary and secondary optical signals are access split. For networks with a small number of access OSCs, a relatively large percentage of the optical power may be tapped for each access splitter. For example, in network 1 in FIG. 1A, there are only two access OSCs, so each access OSC is configured to route 60% of the optical power to the corresponding switch, while directing the remaining 40% to continue propagating to the next access OSC in the respective downstream optical path. In contrast, in networks with larger numbers of access OSCs, each OSC may tap a smaller percentage of the optical power. For example, the embodiments of FIGS. 1B, 2A and 2B each include four access OSCs, each OSC configured to tap 20% of the optical power. Still other embodiments may include more access OSCs, and each OSC may be configured to tap correspondingly less optical power for its corresponding switch, thus enabling the network to maintain a desired balance between the signal strength available to each access OSC under fault and non-fault conditions. Further, the access OSCs in any particular embodiment may have power percentages that differ from one another.

Figure 4:
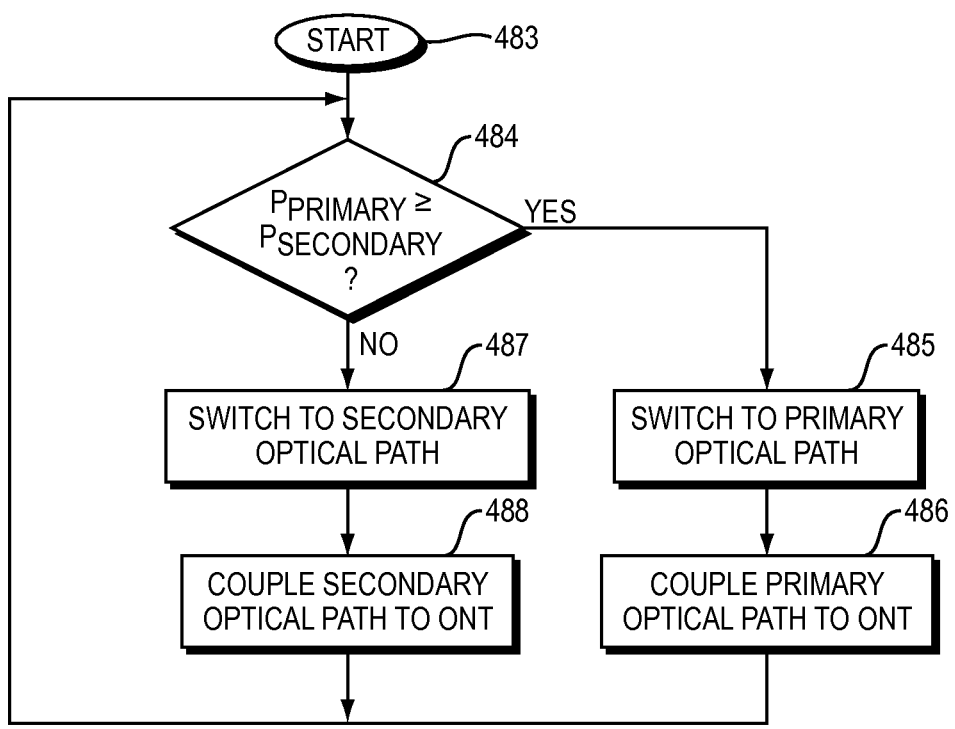
FIG. 4 is a flow diagram that illustrates an example procedure used by an optical switch to determine whether to connect an optical network terminal (ONT) to a network via a primary or a secondary optical path.

FIG. 4 is an example procedure used by an optical switch, such as the switch 30a in FIG. 1A, to determine whether to optically connect the primary or secondary optical path to an ONT, such as the ONT 35 in FIG. 1A. At 483, the procedure starts. At 484, the switch evaluates the power $P_{primary}$ in the primary optical path and the power $P_{secondary}$ in the secondary optical path to determine which is greater. If $P_{primary}$ is greater than or equal to $P_{secondary}$, then at 485 the switch switches to the primary optical path. As a consequence of switching to the primary path, at 486 the switch optically connects the primary path to the ONT. Alternatively, at 484, if $P_{primary}$ is less than $P_{secondary}$, then at 487 the switch switches to the secondary optical path and at 488 optically connects the secondary optical path to the ONT. The procedure then repeats so that the switch continues to check which power is greater.

Figure 5:
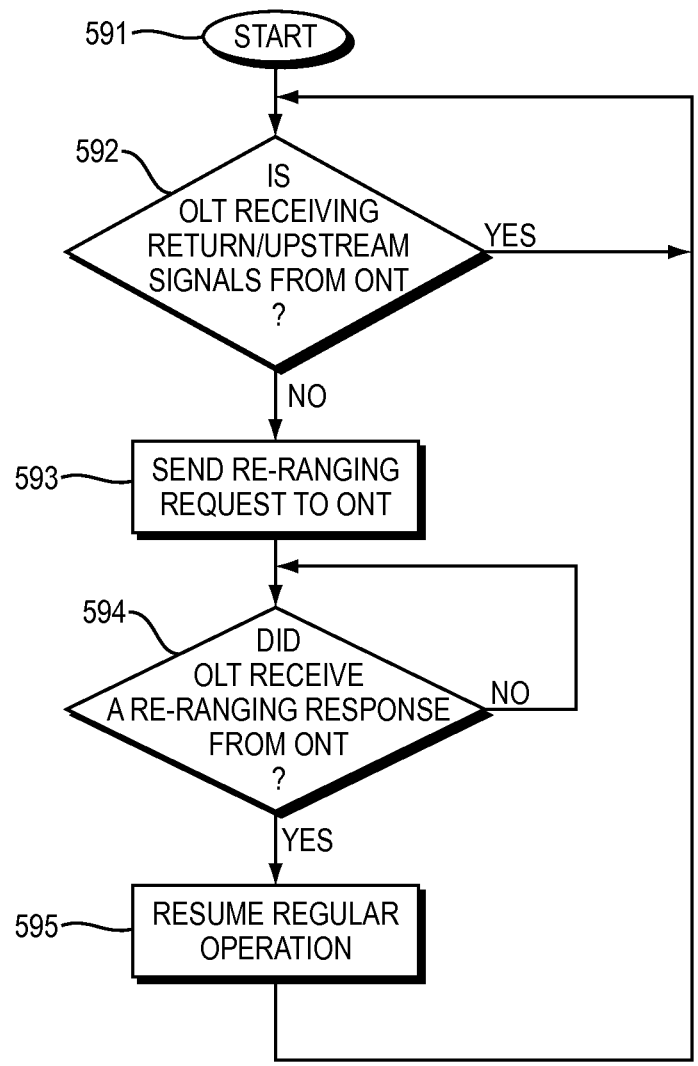
FIG. 5 is a flow diagram that illustrates an example procedure for an optical line terminal (OLT) to monitor for, and recover from, a fault condition.

FIG. 5 illustrates an example procedure for an OLT, such as OLT 205 in FIG. 2A, to recover from a fault condition such as fault 260 in FIG. 2A, and to restore communications with an ONT, such as ONT 265 in FIG. 2A. At 591, the procedure starts. At 592, if the OLT is receiving return (or upstream) signals from the ONT, then at 592, the OLT continues to monitor whether it is receiving return signals from the ONT. At 592, if the OLT is not receiving return signals from the ONT, or experiences upstream communications faults from other ONTs, then at 593, the OLT sends a re-ranging request to the ONT. At 594, the OLT monitors for receipt of a re-ranging response from the ONT. Once the re-ranging response is received from the ONT, then at 595, the OLT resumes regular operation and continues monitoring for return or upstream signals from the ONT. A similar recovery procedure may apply in cases in which the OLT fails to receive upstream signals from more than one ONT in the network.

Figure 6:
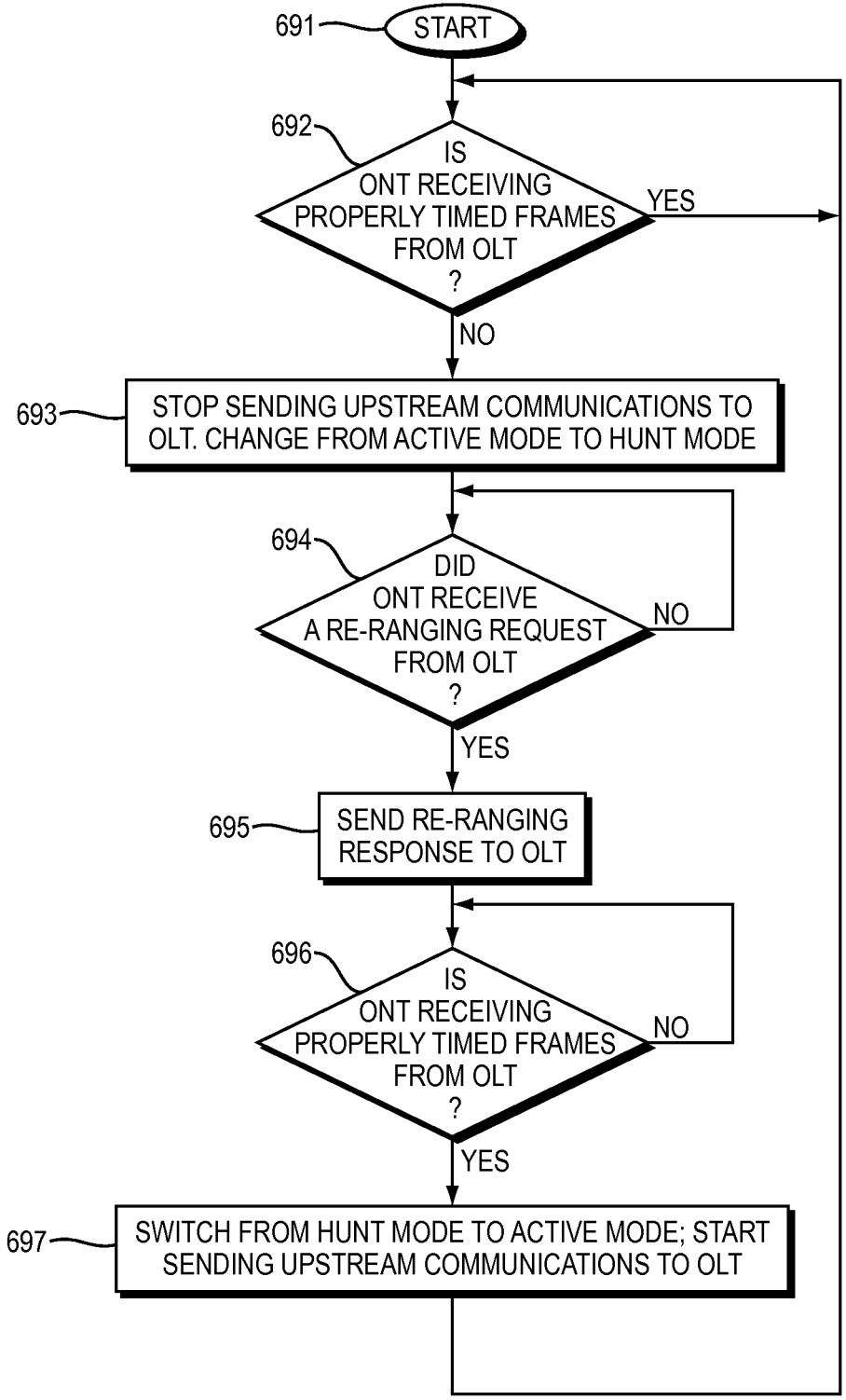
FIG. 6 illustrates an example procedure for an ONT to monitor for, and recover from, a fault condition.

FIG. 6 illustrates an example procedure for an ONT, such as ONT 265 in FIG. 2A, to monitor for and recover from a fault condition such as the fault 260 in FIG. 2A. At 691, the procedure starts. At 692, the ONT monitors for receipt of properly timed frames from the OLT. If properly timed frames are received from the OLT, then the ONT continues to monitor. However, if the ONT does not receive properly timed frames from the OLT, then at 693 the ONT stops sending upstream communications to the OLT and changes from active mode to hunt mode. Then, at 694, the ONT monitors for receipt of a re-ranging request from the OLT. Once the ONT receives a re-ranging request from the OLT, then at 695, the ONT sends a re-ranging response to the OLT. At 696, the ONT monitors for receipt of properly timed frames from the OLT. Once the ONT receives properly timed frames from the OLT, the ONT, at 697, switches from hunt mode to active mode. Then at 697, the ONT switches from hunt mode back to active mode and resumes sending upstream communications to the OLT.

Figure 7:
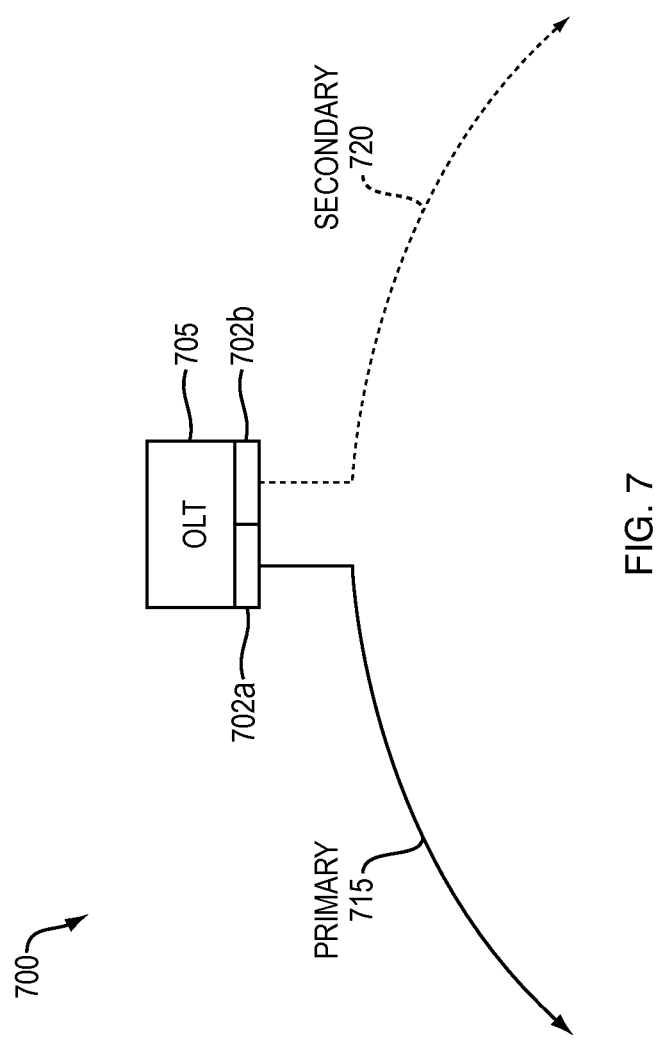
FIG. 7 is a schematic diagram of a portion of an ODN in which primary and secondary optical signals are provided by separate optical port cards of an OLT.

FIG. 7 illustrates a portion of an optical distribution network 700 in which primary and secondary optical signals are provided to the network by separate, first and second optical port cards 702a and 702b of an OLT 705 coupled to primary and secondary optical paths 715 and 720, respectively. Optical signals originating in the first port card 702a propagate onto the primary optical path 715. Similarly, optical signals originating in the second port card 702b propagate onto the secondary optical path 720.

In the network 700 configuration, a head-end passive OSC is not required. One or more passive access OSCs (not shown) may be optically connected to the first and second optical port cards 702a-b via the primary and secondary optical paths 715 and 720, respectively, in a manner similar to that illustrated for the passive access OSCs 25a and 25b in FIG. 1A. Further, an optical switch, (not shown) such as the optical switches 30a and 30b in FIG. 1A, may be optically connected to each access OSC (not shown) between the respective access OSC and any corresponding ONTs (not shown).

Figure 8:
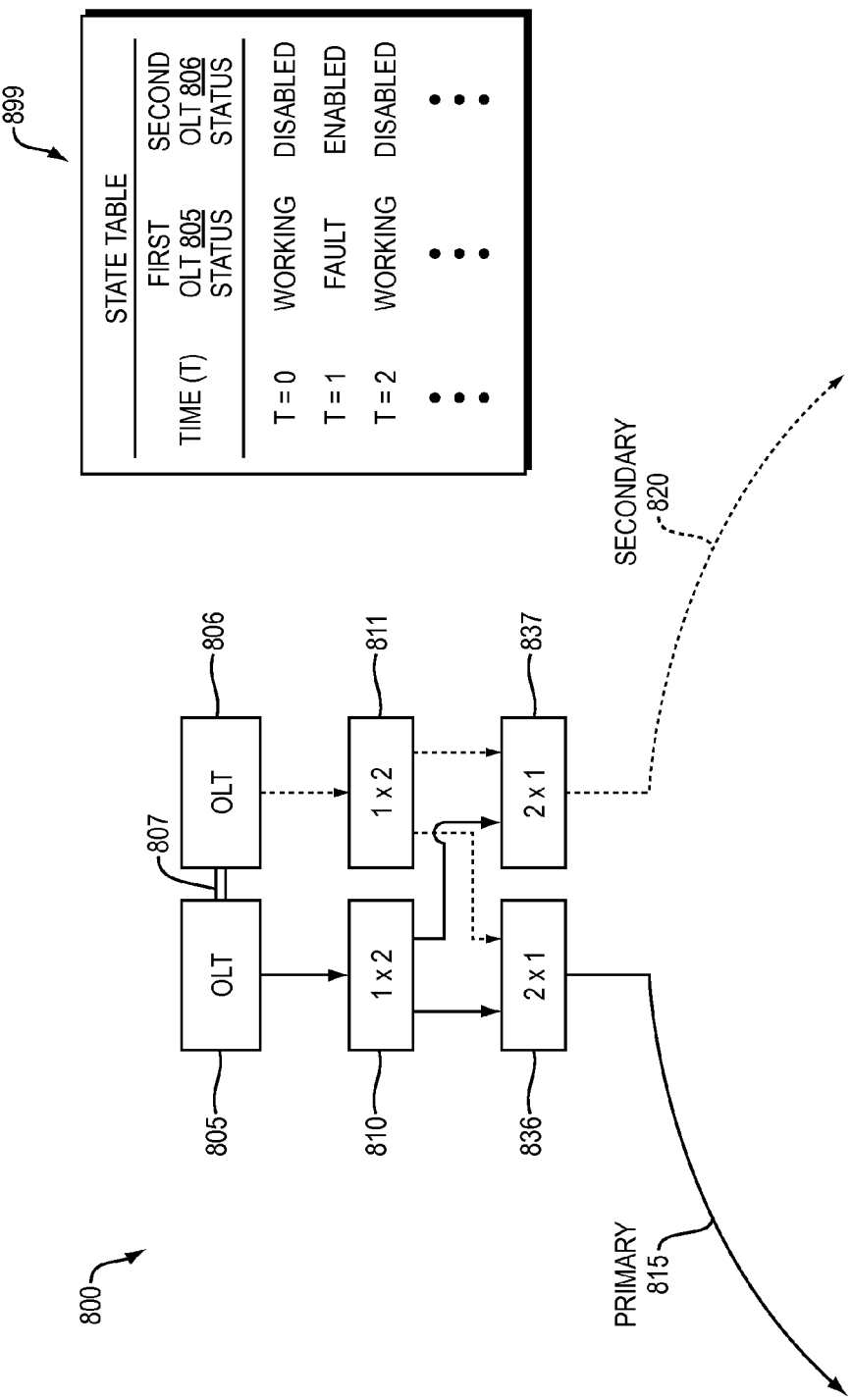
FIG. 8 is a schematic diagram of a portion of an ODN that includes redundant OLTs.

FIG. 8 is a schematic diagram of an optical distribution network 800, which includes redundant OLTs in case a fault condition occurs in one of the OLTs. The network 800 has two OLTs, a first OLT 805 and a second OLT 806. When the first OLT 805 is operating, signals from the first OLT 805 are split by a first 1×2 head-end passive OSC 810. In turn, the split signals from OSC 810 are routed through first and second 2×1 combiner-splitters (OCSs) 836 and 837, whereby the split signals from the first OLT 805 propagate onto a primary optical path 815 and a secondary optical path 820, respectively.

In similar manner, when the second OLT 806 is operating, signals propagating downstream from the second OLT 806 are split by a second 1×2 head-end OSC 811. The split signals from the second head-end OSC 811 are routed through the first and second 2×1 OCSs 836 and 837 onto the primary optical path 815 and the secondary optical path 820. Signals traveling upstream along the primary path 815 are split by the first 2×1 OCS 836 and propagate through both the first and second 1×2 head-end OSCs 810 and 811 to reach both the first and second OLTs 805 and 806. Similarly, upstream signals traveling along the secondary optical path 820 are split in the second OSC 837 and routed through both the first and second head-end OSCs 810 and 811 to reach both the first and second OLTs 805 and 806. With this configuration, upstream optical signals on the primary path 815 or the secondary path 820 reach each respective OLT 805, 806 via only one path, eliminating interference issues. There are no downstream interference issues either, provided that only one of the OLTs 805 and 806 is operating at any given time.

In order to ensure that only one of the OLTs 805, 806 is operating at any given time, one of them may be disabled when the other is operating. For example, state table 899 illustrates the working status of the first OLT 805 and the second OLT 806 at times T=0, T=1, and T=2. At time T=0, the first OLT 805 is working, and thus the second OLT 806 is disabled. At time T=1, the first OLT 805 has a fault condition, and thus the second OLT 806 is enabled. At time T=2, the fault condition has been resolved, and the first OLT 805 is working again, so the second OLT 806 is again disabled. The OLTs 805 and 806 may be linked by a communications path 807 so that each OLT knows when the other OLT is working and may change its working or disabled status accordingly. Alternatively, each OLT 805, 806 may monitor the other OLT's downstream communications and change its functional status accordingly; for example, the secondary OLT can be enabled if it determines that the primary OLT's downstream communications have ceased due to, for example, a failure of the primary OLT or a failure of an optical transmitter of the primary OLT. As another alternative, one OLT 805, 806 may disable its own downstream communications upon ceasing to receive upstream communications from the ONTs, and the disabled OLT may then trigger the other OLT to enable its downstream communications or the other OLT may autonomously enable its own downstream communications following detection of the cessation of the other OLT's downstream communications. It should be understood that fiber channels (not shown) and beamsplitters (not shown) of, for example, 1% power may be used to cross-observe downstream communications in the downstream optical paths.

While this invention has been particularly shown and described with references to example embodiments thereof, it will be understood by those skilled in the art that various changes in form and details may be made therein without departing from the scope of the invention encompassed by the appended claims.

What is claimed is:

1. An optical distribution network, comprising:
 a head-end passive optical splitter-combiner (OSC) optically disposed between an optical line terminal (OLT) and a primary optical path and a secondary optical path, the primary and secondary optical paths optically disposed between the OLT and at least one optical network terminal (ONT);
a plurality of passive access OSCs optically coupled to the head-end passive OSC via the primary and secondary optical paths, wherein the head-end OSC is optically coupled to its optically adjacent access OSCs by either the primary or secondary optical path, and wherein access OSCs optically adjacent to each other are optically coupled to each other by both the primary and secondary optical paths; and
an optical switch optically coupled to a respective access OSC between the respective access OSC and a corresponding ONT.

2. The network of claim 1, wherein the optical switch is configured to switch in an event that it detects a loss of signal from the OLT.

3. The network of claim 1, wherein the optical switch is configured to switch in an event that it detects a loss of signal from the corresponding ONT.

4. The network of claim 1, wherein the optical switch or a monitor of the optical switch is configured to activate an alarm signal in an event that the optical switch loses electrical power.

5. The network of claim 1, further including at least one passive access fanout OSC optically disposed between the respective passive access OSC and multiple corresponding ONTs.

6. The network of claim 1, wherein the OLT is configured to initiate a re-ranging procedure with at least one ONT in an event that the OLT detects a loss of signal from the at least one ONT.

7. The network of claim 1, wherein at least one of the plurality of passive access OSCs has a splitting ratio different from 50%.

8. The network of claim 1, wherein at least one of the plurality of passive access OSCs has a splitting ratio selected based on a number of access OSCs within the optical distribution network.

9. The network of claim 1, wherein the OLT is a primary OLT, the network further including a standby OLT optically coupled to the head-end passive OSC and configured to communicate with the at least one ONT via the primary or secondary optical path in an event of a failure of the primary OLT.

10. A method comprising:
splitting, at a head end of an optical distribution network, optical signals from an optical line terminal (OLT) into a primary optical signal, directed to propagate along a primary optical path, and a secondary optical signal, directed to propagate along a secondary optical path;
access splitting, at access points of the optical distribution network, the primary and secondary optical signals, the access splitting enabling a plurality of optical network terminals (ONTs) to obtain optical access to the primary and secondary signals via optically adjacent access points optically coupled to each other by both the primary and secondary optical paths; and
selectably optically coupling the primary optical path or the secondary optical path to at least one ONT of the plurality of ONTs to enable the at least one ONT to receive the primary or secondary optical signal, respectively.

11. The method of claim 10, wherein access splitting the primary and secondary optical signals includes optically directing respective power percentages of the primary and secondary optical signals to be disposed for optical switching.

12. The method of claim 10, wherein selectably optically coupling the primary or secondary optical path to the ONT includes selectably optically coupling the primary or secondary optical path as a function of relative strengths of the primary and secondary optical signals.

13. The method of claim 10, wherein selectably optically coupling the primary or secondary optical path to the at least one ONT is performed in response to a loss of detected optical power from the OLT.

14. The method of claim 10, wherein selectably optically coupling the primary or secondary optical path to the at least one ONT is performed in response to a loss of detected optical power from the at least one ONT.

15. The method of claim 10, wherein selectably optically coupling the primary or secondary optical path to the at least one ONT is performed via an optical switch, the method further including:
activating an alarm in an event the optical switch loses electrical power.

16. The method of claim 10, further including access fanout splitting the primary or secondary optical signal to enable one or more additional ONTs to receive the primary or secondary optical signal.

17. The method of claim 10, further including initiating a re-ranging procedure between the OLT and the at least one ONT in an event the OLT detects a loss of signal from the at least one ONT.

18. The method of claim 11, wherein access splitting the primary and secondary optical signals includes access splitting the primary and secondary signals at least twice, a respective non-final access splitting and a respective final access splitting being performed for each of the signals, and wherein each respective non-final access splitting includes optically directing respective power percentages of less than 100% of the primary or secondary optical signal to be disposed for optical switching, a respective remainder of the primary or secondary optical signal being further optically directed to propagate along the primary and secondary optical paths, respectively, and wherein each respective final access splitting includes optically directing a respective power percentage of essentially 100% of the primary or secondary optical signal to be disposed for optical switching.

19. The method of claim 11, wherein the power percentages are selected based on a number of times that the primary and secondary optical signals are access split.

20. The method of claim 11, wherein the power percentages are different from 50%.

21. The method of claim 10, wherein the OLT is a primary OLT or a secondary OLT, the method further comprising:
selecting the OLT from the primary OLT and the secondary OLT, the selecting being based at least in part upon a functional status of either the primary OLT or the secondary OLT.

22. An optical distribution network, comprising:
a primary optical path optically disposed between a first optical port card of an optical line terminal (OLT) and at least one optical network terminal (ONT);
a secondary optical path optically disposed between a second optical port card of the OLT and the at least one ONT;
a plurality of passive access OSCs optically coupled to the first and second optical port cards via the primary and secondary optical paths, respectively, wherein the first and second optical port cards are optically coupled to their respective optically adjacent access OSCs by the primary and secondary optical paths, respectively, and wherein access OSCs optically adjacent to each other are optically coupled to each other by both the primary and secondary optical paths; and an optical switch optically coupled to a respective passive access OSC between the respective passive access OSC and a corresponding ONT.

* * * * *